United States Patent
Frazier, Jr. et al.

[15] 3,680,995
[45] Aug. 1, 1972

[54] MOLDING APPARATUS FOR CANDLES AND THE LIKE

[72] Inventors: Preston J. Frazier, Jr.; Daniel W. Hubenak, Jr.; Wallace E. Johnson, all of Houston, Tex.

[73] Assignee: Faroy, Inc.

[22] Filed: June 22, 1970

[21] Appl. No.: 48,071

[52] U.S. Cl. .................... 425/200, 425/243, 425/195
[51] Int. Cl. ............................................... C11c 5/02
[58] Field of Search ..18/1 K, 27, 28, 30 AM, 30 AC, 18/30 AR, 30 HB

[56] References Cited

UNITED STATES PATENTS

| | | | |
|---|---|---|---|
| 2,207,426 | 7/1940 | Bailey | 18/30 AR X |
| 2,831,214 | 4/1958 | Eyles et al. | 18/30 AC |
| 2,461,723 | /1949 | Cowan | 18/30 AR |
| 3,162,703 | 12/1964 | Eyles | 18/30 AC X |
| 3,535,743 | 10/1970 | Stanciu et al. | 18/30 AR |
| 2,574,391 | 11/1951 | Herrly | 18/30 AR |

*Primary Examiner*—Robert L. Spicer, Jr.
*Attorney*—Pravel, Wilson & Matthews

[57] ABSTRACT

Molding apparatus for obtaining and maintaining candle wax in a semi-solid condition and for injecting same under pressure into a mold for forming any desired shape of candle or the like.

5 Claims, 6 Drawing Figures

Preston J. Frazier, Jr.
Daniel W. Hubenak, Jr.
Wallace E. Johnson
INVENTORS

BY

Pravel Wilson & Matthews
ATTORNEYS

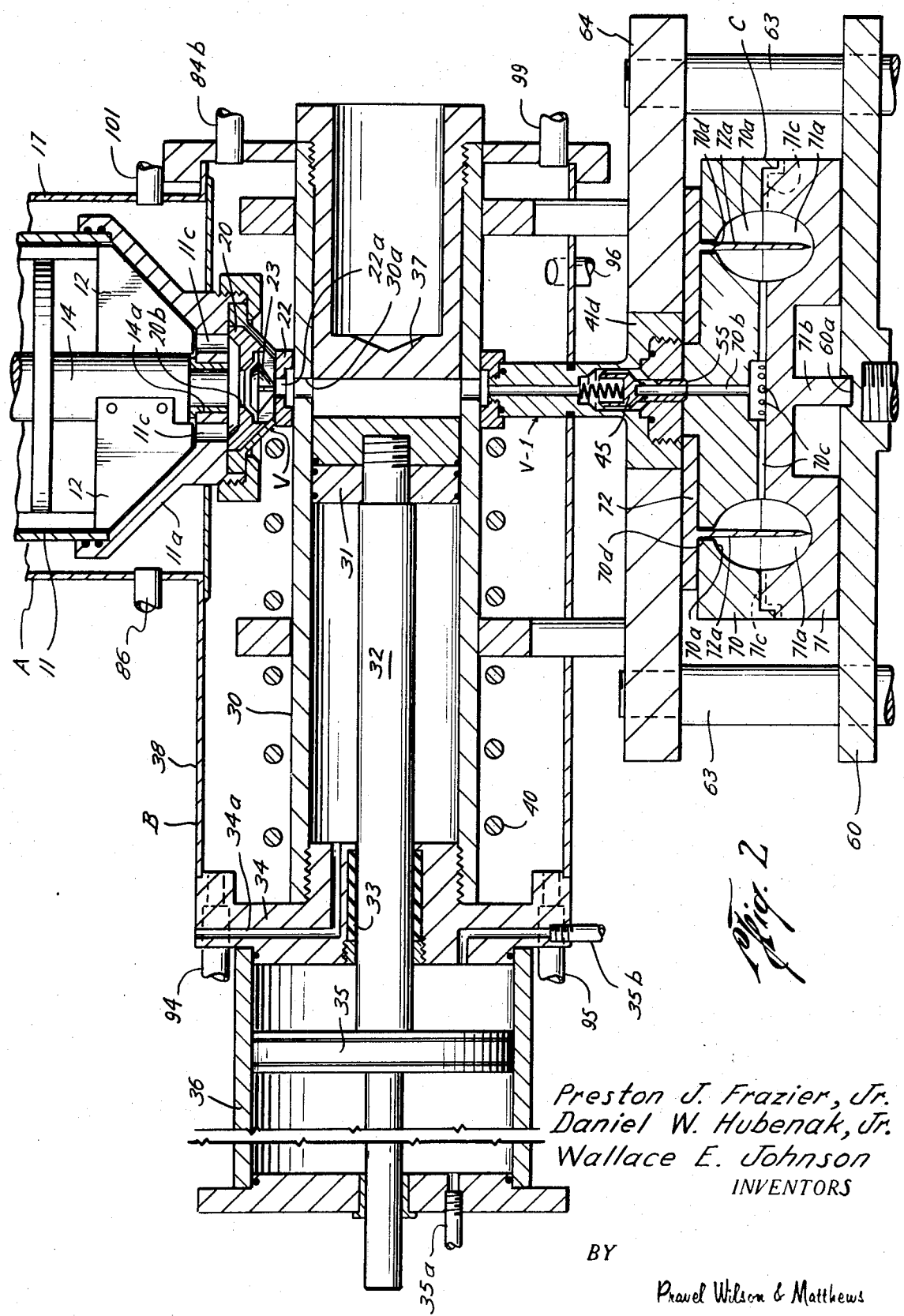

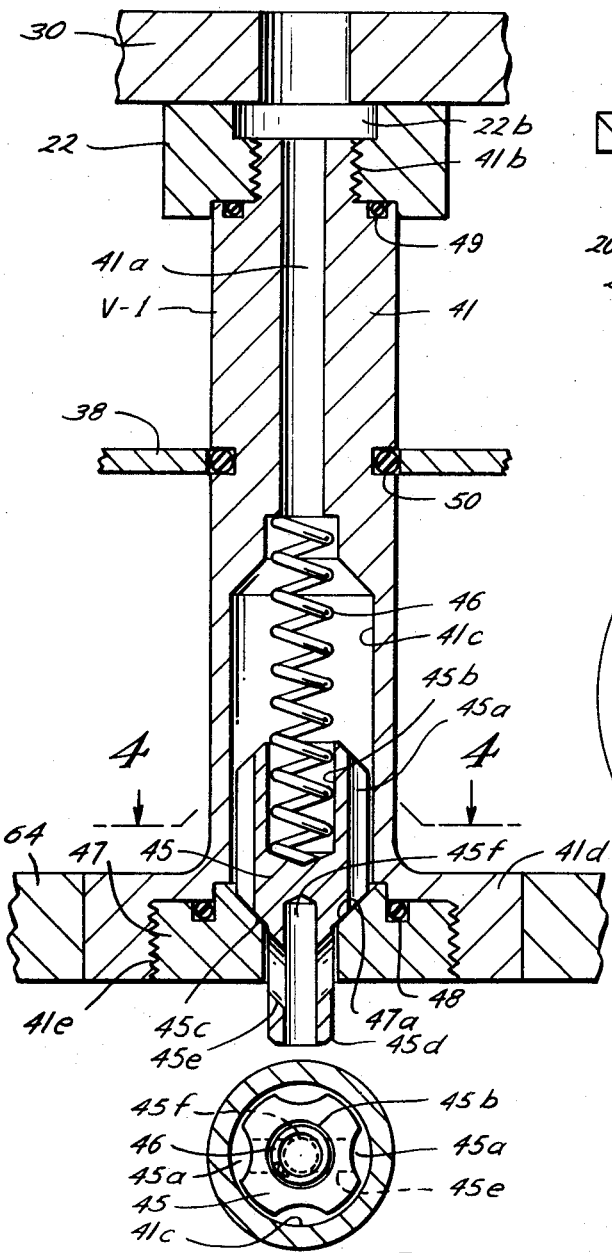

MOLDING APPARATUS FOR CANDLES AND THE LIKE

BACKGROUND OF THE INVENTION

The field of this invention is apparatus for molding candles and the like.

Molding apparatus has been employed in the past for materials which are poured into the molds in a molten state to fill the molds, and then are allowed to harden so that the molded objects can then be separated from the molds. When molten materials are poured directly into the molds, the waiting time for the material to harden is extremely long and other problems such as shrinkage upon cooling are also encountered in handling the molten material. However, so far as is known, no apparatus has been heretofore available for the handling of candle wax in a semi-solid condition so that such wax could be injected under pressure into molds, whereby shrinkage upon cooling is avoided and the candles harden rapidly to permit removal from the mold shortly after the injection into the molding. The direct handling of molten wax by the operator is also unnecessary.

SUMMARY OF THE INVENTION

The present invention relates to an apparatus for the injection molding of candles in shapes provided by the mold, wherein the condition of the candle wax is controlled so as to obtain and maintain the wax in a semi-solid consistency when injected into the mold, whereby the handling of molten wax by the operator is avoided and a rapid hardening of the wax occurs in the mold so that there is substantially no delay in the removal of the molded candles from the mold after the injection. The apparatus is divided into a wax preparation section and an injection section so that wax can be prepared in the preparation section to obtain a semi-solid consistency and then a predetermined quantity can be withdrawn from the preparation section into the injection section so that all or a portion thereof can be injected from the injection section into a removable mold.

BRIEF DESCRIPTION OF THE DRAWINGS

FIG. 2 is a vertical sectional view of a portion of the apparatus illustrated in FIG. 1;

FIG. 3 is a view of a discharge control valve leading from the injection section to a mold;

FIG. 4 is a cross-sectional view taken on line 4—4 of FIG. 3;

FIG. 5 is a vertical sectional view, partly in elevation, of a portion of the apparatus of FIG. 1, particularly illustrating the control valve for the control of the flow of candle wax from the preparation section into the injection section and for preventing the reverse flow thereof; and FIG. 6 is a view of the valve structure of FIG. 5 taken from the bottom thereof.

DESCRIPTION OF THE PREFERRED EMBODIMENT

Figure 1:
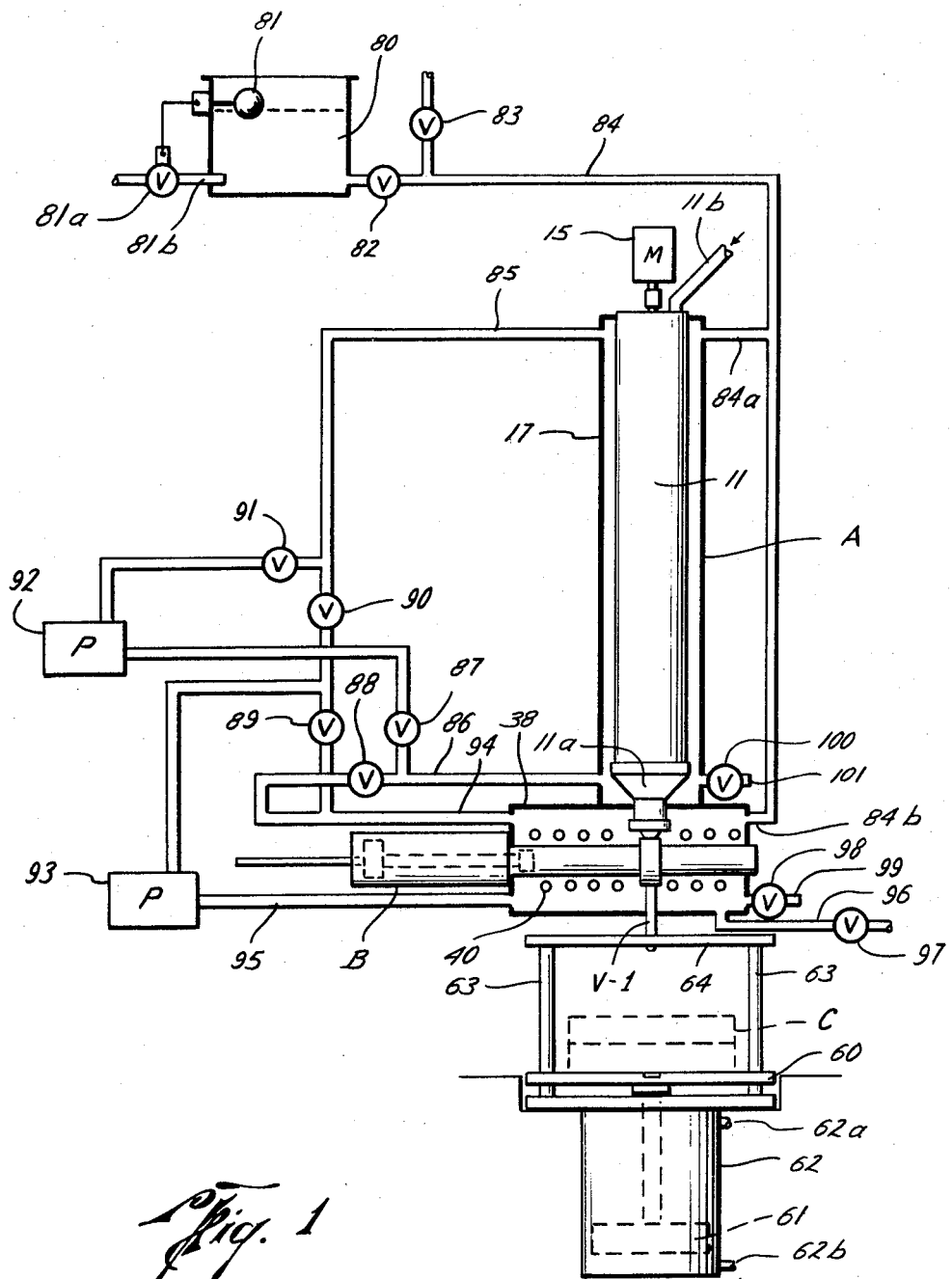
FIG. 1 is an elevation of the apparatus of this invention, partly in section, to illustrate the general arrangement of the apparatus.

In the drawings, the letter A designates generally a preparation section wherein candle wax is prepared for injection through an injection section B into a mold C. Briefly, molten candle wax is introduced into the preparation section A where it is cooled or otherwise conditioned so as to obtain a semi-solid consistency similar to that of a thick milk shake. The injection section B is adapted to withdraw a quantity of the semi-solid candle wax from the preparation section A so as to fill the injection section with a charge of the candle wax. Control means are provided for maintaining the consistency of the candle wax in a semi-solid condition which is basically the same as that in the preparation section A. After a charge is withdrawn into the injection section B from the preparation section A, the injection section B is then utilized for discharging all or a portion of the candle wax therefrom into a mold C which is removably positioned for receiving such discharge. After the cavities in the mold C have been filled, the mold C may be removed to permit it to cool sufficiently for opening, while another mold is disposed in position for receiving the discharge from the injection section B.

Considering the invention more in detail, the preparation section A includes a chamber 11 which preferably has a funnel shaped bottom 11a which may be integral or separately connected to the upper cylindrical portion of the chamber 11. The chamber 11 is provided with an inlet tube 11b (FIG. 1) which is connected to a source of molten candle wax (not shown) which is fed by gravity or any other means to the cylinder or chamber 11 as needed to keep it substantially full at all times. The chamber 11 has therein a dasher or mixer which includes paddles or mixer blades 12 disposed on a rotatable shaft 14 which extends to the upper end of the chamber 11 and which is operated by a motor 15 (FIG. 1). Each end of the shaft 14 is mounted in suitable bearing supports such as indicated at 14a in FIG. 2.

A jacket 17 formed of metal or other suitable material is disposed around the cylinder or chamber 11 to completely enclose same for receiving water or other material for controlling the temperature of the candle wax within the chamber 11, as will be more fully explained.

The lower end of the chamber 11 is open at discharge ports 11c so that the candle wax within the chamber 11 may be withdrawn therefrom into the injection section B. A value V is mounted between the preparation section A and the injection section B for controlling the movement of the candle wax therebetween, as will be more evident hereinafter.

Although various types of valves may be employed for controlling the movement of the candle wax from the preparation section A into the injection section B, the preferred form of the valve V is illustrated in FIGS. 2, 5 and 6. As shown therein, the valve V includes an upper valve seat member 20, a lower valve seat member 22 and a valve element 23. The valve element 23 has a central solid portion 23a which has an upper tapered surface 23b which is adapted to engage a correspondingly tapered surface 20a on the upper seating member 20 to completely close off flow through the opening 20b in the valve seat 20. The lower portion of the valve element 23a has a plurality of ribs 23c which serve as guiding ribs within a guiding slot or cylindrical opening 20c. In other words, the valve element 23 is adapted to move longitudinally within the recess 20c, with the outer edges of the ribs 23c in engagement with the wall of the opening 20c so as to guide same as the element 23 moves longitudinally from the seated position shown in FIG. 5 to the open position shown in FIG. 2. When the valve element 23 is moved downwardly to the open position shown in FIG. 2, the ribs 23c seat upon the lower seat member 22 and because of the spacing then between the annular seat 23b and the upper seat surface 20a, the candle wax may flow around the valve element 23 and through the lower opening 22a in the lower seating element 22.

The injection section B is preferably disposed below the preparation section A so as to extend substantially perpendicularly with respect thereto. The injection section B includes a cylinder 30 having a piston or plunger 31 disposed therein for longitudinal movement relative thereto. The piston or plunger 31 is connected to a piston rod 32 which extends through a suitable packing element 33 in a flange 34 connected at the left end of the cylinder 30, and such rod 32 is connected to another piston 35 which is in a cylinder 36. The cylinder 36 is closed at both ends except for tubes 35a and 35b which control the inlet of fluid for the movement of the piston 35 longitudinally within the cylinder 36. The stroke of the piston 35 is sufficient to move the piston or plunger 31 substantially the full length of the cylinder 30, so that all of the movements of the piston 31 are controlled by moving the piston 35. To provide for the inlet and outlet of atmospheric air on the backside of the plunger 31, an air vent line 34a is provided in the flange 34 (FIG. 2). Thus, on the stroke of the plunger 31 to the right as viewed in FIG. 2, air may enter the cylinder 30 through the vent line 34a, but on the return stroke of the plunger 31 to the left, air may be forced outwardly of the cylinder 30 through the vent line 34a to thereby prevent any fluid lock within the cylinder 30.

It is to be noted that the cylinder 30 is closed at the right-hand end by a plug 37 which is disposed so that an inlet port 30a in the wall of the cylinder 30 is still open to the interior of the cylinder 30. The port 30 is also open to the passage or port 22a in the lower valve seat 22 so that the wax which is withdrawn from the chamber 11 through the open valve V enters the chamber or cylinder 30 through the ports or openings 22a and 30a. Such entry occurs when the plunger 31 is being moved to the left as viewed in FIG. 2. Upon a movement of the plunger 31 to the right, the wax within the cylinder 30 will be under a sufficient amount of pressure to force the valve element 23 to move upwardly from the open position of FIG. 2 to the closed position of FIG. 5. Such construction prevents any return of the wax within the cylinder 30 to the cylinder or chamber 11 during the injection stroke of the plunger 31, as will be more evident hereinafter. A cylindrical jacket 38 formed of metal or other material is disposed around the cylinder 30 so as to receive water or other fluid therein to control the temperature of the wax within the cylinder 30 so as to maintain same in a semi-solid state and having a consistency similar to a thick milkshake. The consistency of the candle wax may be slightly thicker in the cylinder 30 than it was in the chamber 11, but basically, the temperature is controlled in the jacket 38 so as to keep the consistency of the candle wax in the cylinder 30 at about the same status as it was in the preparation chamber or section A. The control of the temperature will be described hereinafter with respect to the use of fluids for such control. It is noted that an electrical heating cable 40 is also preferably disposed in the water jacket 38 so that heat may be added when it becomes necessary to control the consistency of the candle wax within the cylinder 30. The electrical heating cable 40 is connected to any suitable source of electrical power (not shown).

To control the injection of the semi-solid candle wax from the injection chamber 30 into the mold C, a second valve V-1 (FIGS. 2 and 3) is provided. Prior to the positioning of the mold C below the valve V-1, it is held in the closed position shown in FIG. 3, wherein the valve V-1 is illustrated as having a tubular body 41 with a longitudinal passage 41a therethrough. The upper end of the body 41 has threads 41b which are threaded into suitable threads in an inlet port 22b in the ring 22 which surrounds the cylinder 30 and which is a part of the lower valve seat described heretofore in connection with the valve V (FIG. 2).

The valve body 41 has a counterbore 41c which is larger than the bore 41a so as to receive a vertically moving valve element 45. The valve element 45 has a plurality of longitudinal recesses 45a formed between ribs 45b (FIG. 4) through which wax may flow during the injection thereof from the cylinder 30 into the mold M, as will be explained more in detail. The valve element 45 has a recess 45b for receiving a spring 46 or other suitable resilient means which urges the valve element 45 downwardly to cause the tapered seating surface 45c of the valve element 45 to engage a correspondingly tapered seat 47a in a seat element 47 to thereby close off flow through the valve V-1 (FIG. 3). The body 41 is provided with a flange 41d and with suitable threads 41e so as to receive the seat element 47 together with a seal 48 therebetween. The seal 48 is preferably an O-ring formed of rubber or other suitable resilient material. Also, it is to be noted that other suitable O-ring seals 49 and 50 are preferably provided to seal at suitable points of possible leakage.

Referring further to the valve element 45, it is to be noted that it has a lower smaller diameter stem 45d with lateral ports 45e which communicate with a central port or passage 45f. When the valve element 45 is in the seated position shown in FIG. 3, the ports 45e are below the seat 47a and therefore no flow can occur through the valve V-1.

The valve V-1 is pushed upwardly to the open position shown in FIG. 2 by the engagement of the lower stem 45d with a recess 55 in the mold C. Such engagement occurs when the mold C has been moved into the position shown in FIG. 2, as will be more fully explained.

The mold C is preferably positioned below the valve V-1 by means of a hydraulic or air lift which includes a vertically movable platform 60 operated by a movable piston 61 disposed in a cylinder 62 having fluid inlets and outlets 62a and 62b for the conventional control of fluid to move the piston 61 either upwardly or downwardly. The platform 60 is thus moved upwardly or downwardly by the control of the fluid admitted to the cylinder 62. The platform 60 is guided in its movement by means of guide rods 63 which are connected to a support plate 64 at their upper end.

The mold C may take different forms, and the shape of the candles to be molded is determined by the shape of the cavities provided internally of the mold sections 70 and 71 in the mold C illustrated in FIG. 2. The mold cavities 70a and 71a are disposed in a spaced relationship so as to provide a plurality of candles which have an egg shape or any other desired shape. The upper mold section 70 has one or more inlet openings 70b which communicate through lateral openings 70c to the mold cavities 70a, 71a.

Preferably, a third plate 72 is provided which has a plurality of elongate stems 72a therewith which extend downwardly therefrom through openings 70d in the upper mold section 70. Such elongate elements 72a are disposed within each of the cavities 70a, 71a so as to form holes in the final candle for receiving a candle wick which is inserted after the molding operation by any suitable means or by hand.

The mold C preferably has an aligning pin 71b at its lower portion which fits into an aligning groove or recess 60a so as to facilitate the positioning of the mold C in a position directly below the valve V-1, whereby the port 70b is aligned with the opening 45f when the mold C is moved to the uppermost position shown in FIG. 2.

For controlling the temperature of the candle wax in the preparation section A so as to render it semi-solid, and to maintain such consistency in the injection section B, fluid such as water is circulated through the jackets 17 and 38. Reference is now made in particular to FIG. 1 wherein the circulation system is illustrated in detail. The water or other cooling fluid which is supplied to the system is supplied from a reservoir 80 which normally has a float 81 therewith for controlling the level in the reservoir 80 so as to have a constant level supply. The float 81 controls a valve 81a in the known manner so as to control the inlet of water through a pipe or faucet 81b into the reservoir 80 as needed. A valve 82 is connected at the discharge from the reservoir 80, and a valve 83 may in incorporated adjacent thereto, as will be explained. The valve 82 is in a flow line 84 which has a side tube 84a therefrom entering the jacket 17 near its upper end, while its lower end 84b enters the water jacket 38. The jacket 17 also has a tube 85 at its upper end and a tube 86 at its lower end with suitable piping interconnecting same and which have valves 87, 88, 89, 90, and 91 therewith. Pumps 92 and 93 are also provided in the system, as will be explained. Suitable flow lines 94 and 95 lead from the jacket 38, and an additional line 96 leads through a valve 97 from the jacket 38. A valve 98 is positioned in line 99 from the jacket 38, and a similar valve 100 is positioned in line 101 from the jacket 17.

To understand the relationship to the various valves in the system illustrated in FIG. 1, it should be first pointed out that there are two separate water jackets 17 and 38 which are physically separate from each other, although they may be interconnected by switching the valves heretofore described and hereafter explained. For example, to fill both of the jackets 17 and 38 with water, valves 98, 100, and 83 are closed, and the rest of the valves are opened. The water from the reservoir 80 will then flow to the jackets 17 and 38. If it is desired to drain the entire system, valves 97 and 82 are closed, and all of the other valves are opened.

To circulate water in both jackets 17 and 38 as one system, valves 98, 100, 89, 87, 91, 83, and 97 are closed and the other valves are opened; pump 93 is turned on and pump 92 is turned off. Such a situation would be desirable for example in the event it was necessary or desirable to heat the water in the jacket 17, because the only heating element 40 in the system is in the water jacket 38. Such a system therefore eliminates the necessity for a duplication of the heating element 40 in both of the jackets, while at the same time providing for a transfer of heat in the event it becomes necessary to prevent the wax from becoming too thick or solidified in the system. Should it be desirable to cool both jackets 17 and 38 while they are set up as one system, the exhaust valve 98 is opened so as to allow cold water from the reservoir 80 to enter by gravity into the system.

Should it be desirable to circulate water in both jackets separately as two systems, valves 98, 100, 88, 90, 83, and 97 are closed and the other valves are opened. Both of the pumps 92 and 93 are then operating. Should it be desirable to cool the water jacket 17 when water is being circulated in the jackets 17 and 38 separately, exhaust valve 100 is opened to permit water to pass through the jacket 17 and thereby to provide the cool water from the source 80 to the jacket 17; and should it be desirable to cool the jacket 38, the exhaust valve 98 is opened so that the cool water flows from the reservoir 80 through the line 84 and inlet line 84b into the jacket 38.

Thus, it can be seen that the means to control the temperatures in the preparation section A and in the injection section B may be operated in several different ways so as to obtain maximum control over the two sections for maintaining the proper consistency of the candle wax within the system.

In the operation or use of the apparatus of this invention, the candle wax is supplied to the preparation section A from any suitable source such as a heated tank (not shown) which discharges through the tube 11b into the cylinder 11. The candle wax is in a molten state as it is fed through the tube 11b, and normally would be at a temperature of about 170° F. at that time. In the preparation section A, the water or other fluid in the jacket 17 cools the candle wax and mixes it with the mixing blades or dasher 12 so as to obtain the wax in a semi-solid state which is still capable of flow, and preferably is of a consistency comparable to a thick milk shake. At this point, the temperature of the wax is preferably reduced to about 150° F. or slightly thereabove.

After the mold C is positioned for receiving a charge of candle wax as shown in FIG. 2, so that the valve V-1 is open, a charge of candle wax is withdrawn from the preparation section A into the injection section B. It is not necessary to put the mold C in position prior to such withdrawal of the wax into the injection section B. In any event, after a quantity of the candle wax has been withdrawn by the movement of the plunger 31 to the left as viewed in FIG. 2, the injection of such wax into the mold C thereafter can be accomplished by a movement of the plunger 31 to the right as viewed in FIG. 2. The candle wax is still in the semi-solid flowable condition so that it is forced under pressure through the valve V-1 which is held open by the mold C as shown in FIG. 2 and such wax enters the mold and fills the cavities of whatever shape is provided by same. It will be appreciated that different shapes of the cavities 70a and 71a may be provided so as to produce different shapes of the candles. Suitable bleed holes or ports indicated by the dotted lines 71c are provided to allow the air to escape as the wax is introduced into the cavities in the mold C.

After the mold C has been filled with the wax, the mold C is removed from its position below the valve V-1 (FIG. 2), so that the spring 46 acts to move the valve element 45 downwardly to the closed position. Then, the sections of the mold C are separated, first removing the mold section 72 so as to leave the wick holes in each of the candles within the mold sections 70 and 71. Then the sections 70 and 71 are separated and the molded candles can be removed by hand or other suitable means. It takes only 10 minutes or other relatively short period of time for the wax to cool sufficiently for the removal of such candles, depending upon the thickness of the candle in each cavity of the mold C, but during the cooling period, another mold having mold cavities of the same or different shape may be positioned as shown in FIG. 2 and may receive all or a portion of the charge from the injection section B. It will be appreciated that a plurality of the molds C may be employed, using different configurations or shapes as desired for the candles. The quantity of the wax which is received in the preparation section A may be controlled by controlling the wax which is admitted thereto from the source, and the charge which is received within the injection section is controlled by the movement of the plunger 31.

The foregoing disclosure and description of the invention are illustrative and explanatory thereof, and various changes in the size, shape, and materials as well as in the details of the illustrated construction may be made without departing from the spirit of the invention.

We claim:

1. Molding apparatus for candles the like, comprising:

a source of supply molten candle wax;

a preparation section having a container for receiving molten candle wax from said source and agitator means in said container for mixing the wax therein for substantially uniform temperature control;

means for controlling the temperature of the wax in said preparation section so as to render same semi-solid but flowable;

an injection section disposed below said preparation section and operably connected with said preparation section and having a single piston means for creating a reduced pressure in said injection section for withdrawing a quantity of the candle wax from said preparation section into said injection section for subsequent discharge therefrom;

means for controlling the temperature of the wax in said injection section to maintain same in a semi-solid but flowable consistency; and a mold for receiving at least a part of the discharge of the wax from said injection section.

2. The apparatus set forth in claim 1, wherein said injection section includes:

a cylinder having means for communicating with said preparation section for receiving said single piston means for longitudinal movement therein to withdraw the wax from the preparation section into said cylinder upon a stroke of the piston in one direction and for discharging the wax from said cylinder upon a stroke of the piston in the other direction.

3. The structure set forth in claim 2, including:

valve means between said preparation section and said injection section for permitting flow of the wax from the preparation section into said injection section while preventing the return of wax from the injection section into the preparation section; and another valve means at the discharge from said injection section for permitting a discharge of wax from said injection section only when said mold is in position for receiving the wax therefrom.

4. The structure set forth in claim 1, wherein said means for controlling the temperature of the wax in said preparation section and said means for controlling the temperature of the wax in said injection system, includes:

a separate water jacket surrounding each of said preparation and injection sections;

means for selectively circulating water in either or both of said water jackets; and heating means in the water jacket for said injection section for supplying heat if needed for maintaining the wax in the semi-solid but flowable consistency in said injection section.

5. The structure set forth in claim 1, wherein said means for controlling the temperature of the wax in said injection section includes:

a water jacket surrounding said injection section; and heating means in said water jacket for supplying heat if needed for maintaining the wax in the semi-solid but flowable consistency in said injection section.

* * * * *